United States Patent
Scheibli et al.

(10) Patent No.: US 10,503,734 B2
(45) Date of Patent: Dec. 10, 2019

(54) EXTERNAL OFFLINE QUERY OPTIMIZATION

(71) Applicant: SAP SE, Walldorf (DE)

(72) Inventors: Daniel Scheibli, Karlsruhe (DE); Frank O. Schulz, Schwetzingen (DE)

(73) Assignee: SAP SE, Walldorf (DE)

( * ) Notice: Subject to any disclaimer, the term of this patent is extended or adjusted under 35 U.S.C. 154(b) by 328 days.

(21) Appl. No.: 14/798,785

(22) Filed: Jul. 14, 2015

(65) Prior Publication Data

US 2017/0017689 A1 Jan. 19, 2017

(51) Int. Cl.
*G06F 17/30* (2006.01)
*G06F 16/2453* (2019.01)
*G06F 12/0802* (2016.01)

(52) U.S. Cl.
CPC .... *G06F 16/24542* (2019.01); *G06F 12/0802* (2013.01); *G06F 16/2453* (2019.01); *G06F 16/24539* (2019.01)

(58) Field of Classification Search
CPC ....................................................... G06F 17/30
See application file for complete search history.

(56) References Cited

U.S. PATENT DOCUMENTS

| | | | |
|---|---|---|---|
| 7,318,148 B2 | 1/2008 | Scheibli | |
| 8,417,588 B2 | 4/2013 | Ringl et al. | |
| 2008/0256025 A1* | 10/2008 | Bestgen | G06F 17/30424 707/999.002 |
| 2010/0306188 A1* | 12/2010 | Cunningham | G06F 17/30463 707/713 |
| 2011/0029508 A1* | 2/2011 | Al-Omari | G06F 17/30433 707/718 |
| 2011/0055201 A1* | 3/2011 | Burger | G06F 17/30424 707/719 |

* cited by examiner

*Primary Examiner* — Khanh B Pham
(74) *Attorney, Agent, or Firm* — Fish & Richardson P.C.

(57) ABSTRACT

A determination is made that an execution plan for a received structure query language (SQL) database query to execute on a database is not present in a database plan cache. An external offline optimization process is triggered to generate an externally optimized execution plan for the SQL database query. The generation of the externally optimized execution plan includes: receiving all or part of the received SQL database query as SQL statements and metadata associated with the database, looping over and analyzing all the received SQL statements, selecting at least one an optimization strategy for the SQL statements; and executing the selected at least one optimization strategy to generate the externally optimized execution plan. The externally optimized execution plan is then pinned into the database plan cache.

9 Claims, 4 Drawing Sheets

EXTERNAL OFFLINE QUERY OPTIMIZATION

BACKGROUND

Executing structured query language (SQL) statements in a database management system (DBMS), requires the DBMS to go through the following high level steps: 1) parse the SQL statement (understand what the SQL instructions are); 2) optimize a logical execution plan for the query using an optimizer (decide how best to perform the SQL instructions); 3) perform the execution plan. Each of these steps is time critical and the combination of all three determines the total execution time of a query. Regardless of overall SQL optimization techniques, the optimizer still has to be run. Local/online execution of an optimizer (adhoc) as part of query execution can require valuable system resources and necessitate highly streamlined optimizers (e.g., using rule-based rewriting strategies and similar heuristics) to permit low resource usage and fast completion time.

SUMMARY

The present disclosure relates to computer-implemented methods, computer-readable media, and computer systems for external offline query optimization.

A determination is made that an execution plan for a received structure query language (SQL) database query to execute on a database is not present in a database plan cache. An external offline optimization process is triggered to generate an externally optimized execution plan for the SQL database query. The generation of the externally optimized execution plan includes: receiving all or part of the received SQL database query as SQL statements and metadata associated with the database, looping over and analyzing all the received SQL statements, selecting at least one an optimization strategy for the SQL statements; and executing the selected at least one optimization strategy to generate the externally optimized execution plan. The externally optimized execution plan is then pinned into the database plan cache.

One design-time computer-implemented method includes determining that an execution plan for a received structure query language (SQL) database query to execute on a database is not present in a database plan cache; triggering an external offline optimization process to generate an externally optimized execution plan for the SQL database query, the generation including: receiving all or part of the received SQL database query as SQL statements and metadata associated with the database; looping over and analyzing all the received SQL statements; selecting at least one an optimization strategy for the SQL statements; and executing the selected at least one optimization strategy to generate the externally optimized execution plan; and pinning the externally optimized execution plan into the database plan cache.

Other implementations can include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein the triggering is a result of meeting or exceeding a threshold value associated with the received database query.

A second aspect, combinable with the general implementation, wherein the generated externally optimized execution plan is one candidate execution plan of a plurality of execution plans.

A third aspect, combinable with the general implementation, comprising executing the candidate execution plans on the database to determine a best performing execution plan based on the lowest actual execution time on the database.

A fourth aspect, combinable with the general implementation, wherein an adhoc optimizer generates a default execution plan for the received database query in parallel with the generation of the externally optimized execution plan using the external offline optimization process.

A fifth aspect, combinable with the general implementation, comprising replacing the default execution plan with the externally optimized execution plan.

A sixth aspect, combinable with the general implementation, comprising inserting the externally optimized execution plan into the plan cache using a direct interface exposed by the plan cache.

The subject matter described in this specification can be implemented in particular implementations so as to realize one or more of the following advantages. First, using external offline query optimization (a second-stage, "offline" optimizer), complex queries can be effectively optimized within normally given time limits. By "offline," it is meant that query optimization is not part of the query execution process and takes place in a processing environment external to the processing of a query as compared to local, "adhoc" query optimization. Second, when hosting backend functionality for cloud applications, the developer or the operator of the system can determine a set of upfront known queries with a high execution rate and pre-optimize those queries—saving considerable resources and improving overall query response times in cloud-based and high-volume statement execution application environments. Third, query optimization for particular queries (e.g., complex, resource-intensive (expensive), repeatable, etc.) is moved out of a database management system (DBMSs) and into the external environment which provides considerably more time and dedicated resources to find a best (or a number of the best) execution plan as the offline optimizer is not constrained by system resources and time constraints when compared to adhoc optimization. The additional available system resources also permits additional optimization techniques to be leveraged that normally would not be feasible in an adhoc query optimization process. Fourth, optimized execution plan(s) for queries can be imported back into the DBMS and made available in an execution plan cache for use separately or in combination with adhoc query optimization efforts. Other advantages will be apparent to those of ordinary skill in the art.

The details of one or more implementations of the subject matter of this specification are set forth in the accompanying drawings and the description below. Other features, aspects,

DESCRIPTION OF DRAWINGS

Like reference numbers and designations in the various drawings indicate like elements.

DETAILED DESCRIPTION

Figure 1:
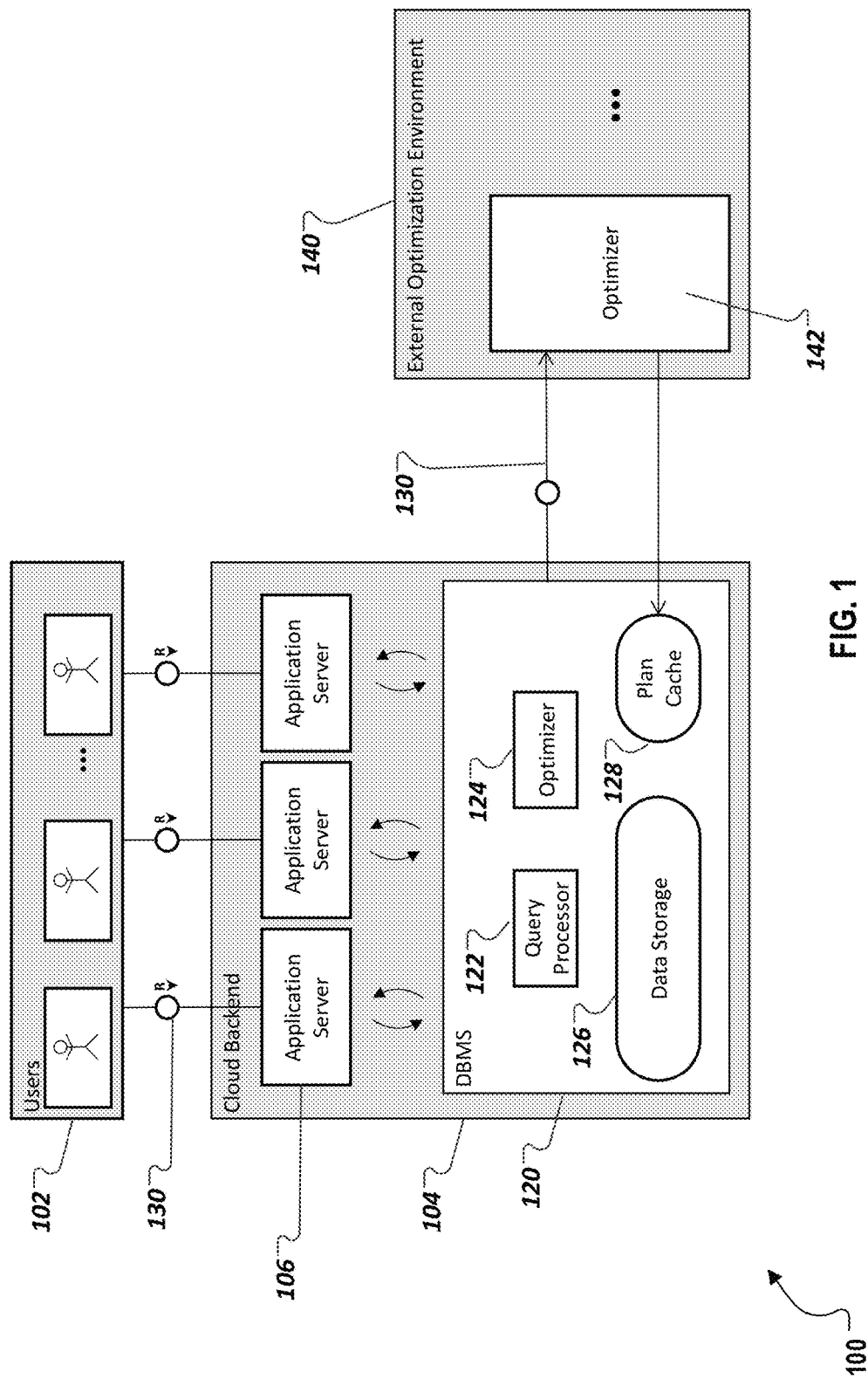
FIG. 1 is a high-level architecture block diagram illustrating an example distributed computing system (EDCS) for external offline query optimization, according to an implementation.

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

Executing structured query language (SQL) statements in a database management system (DBMS), requires the DBMS to go through the following high level steps:
1) Parse the SQL statement (understand what the SQL instructions are)
2) Optimize a logical execution plan for the query using an optimizer (decide how best to perform the SQL instructions);
3) Perform the execution plan.

Each of these steps is time critical and the combination of all three determines the total execution time of a query.

In order to optimize the first two steps, a DBMS can employ multiple techniques.

In case of dynamic SQL, the application can "prepare" a SQL statement and then execute it multiple times. During prepare, the SQL statement is parsed and optimized, the subsequent execution then can reuse the created execution plan.

In case of static SQL, the application developer undertakes additional steps during program compilation in order to extract the SQL statements. Those SQL statements can then be "bound" to the DBMS which means that execution plans are created and stored inside the DBMS. If the application is then executed, the stored execution plans are looked up and used.

Also some DBMSs, for example the HANA database by SAP SE, implement plan caches. This technique allows the DBMS to transparently store and reuse execution plans. In this way a second application/user can transparently reuse an existing execution plan if executing a previously executed SQL statement.

However, these techniques are largely trying to reduce the number of times the optimizer has to do its work. Regardless of overall SQL optimization techniques, the optimizer still has to be run. Local/online execution of an optimizer (adhoc) as part of query execution can require valuable system resources and necessitate highly streamlined optimizers (e.g., using rule-based rewriting strategies and similar heuristics) to permit low resource usage and fast completion time.

Observations show that: 1) queries can become very complex (e.g., multiple—hundreds or thousands—of operators) and are therefore deemed too complex to effectively be optimized within normally given time limits, and 2) where local hosting of backend functionality for cloud applications exist, the developer and operator of the system can determine a set of upfront known queries with a high execution rate and pre-optimize those queries—saving considerable resources and improving overall query response times in cloud-based and high-volume statement execution application environments.

The following description is focused on moving query optimization for particular queries (e.g., complex, resource-intensive (expensive), repeatable, etc.) out of the DBMS and into an external environment (a second-stage, "offline" optimizer). By "offline," it is meant that query optimization is not part of the query execution process. With the offline optimizer, considerably more time and dedicated resources can be spent to find the best (or a number of the best) execution plan as the offline optimizer is not constrained by system resources and time constraints as adhoc optimization. The additional available system resources permits additional optimization techniques to be leveraged that normally would not be feasible in an adhoc query optimization process. For example:

Existing optimization approaches can try more variants/search deeper.
  Considering the particular/complex queries mentioned above, it is likely that there are cases where options cannot be easily explored. Here Monte Carlo simulations can be an additional alternative (similar to approaches used in transportation management, etc.).
  Building on the fact that access is available to a production database (e.g., in a cloud-based computing case), more thorough statistics can be created on database tables and their content. With that, better optimization decision can be done.
  Building on the fact that access is available to the production database (e.g., in a cloud-based computing environment), test executions can be performed of candidate execution plans. By actually testing/trying queries, cases can be determined where query payload estimates are wrong. Testing and comparing a few different execution plan variants is also an option.
  A consideration can also be to store multiple execution plans for a single SQL. With that, it might be possible to react on the specific values of given bind variables. For instance if a regional retailer is considered where a large majority of customers comes from, for example, the United States of America, if a query has a customer country as bind variable, it would be worth it to have an execution plan for an ="US" and a !="US" case. This is only one example of a known concept of Parametric Query Optimization (PQO), which recognizes that for different values of a relevant parameter, a potentially different optimal execution plan might exist. Extending the plan cache to hold several candidate plans for a SQL statement, different parameter values can be specifically supported. Conceptually, the parameter space is divided into regions, where each region is defined by its optimal execution plan. If a statement is to be executed by the DBMS and it is already contained in the plan cache, the current values of the parameters are determined and the "closest" existing plan in parameter space is chosen from the plan cache. Using the optimization environment it is possible to subsequently calculate a good plan for given parameter values and insert it into the plan cache for future use. Over time, the plan cache for one statement will become more and more complete regarding the parameter space. Intelligent strategies for removing plan cache entries can be applied, such that only the most representative entries for covering the parameter space are kept.

The optimized execution plan for these queries is then imported back into the DBMS and made available in the execution plan cache for use separately or in combination with adhoc query optimization efforts.

FIG. 1 is a high-level architecture block diagram illustrating an example distributed computing system (EDCS) 100 for external offline query optimization, according to an implementation. At a high level, the illustrated EDCS 100 includes or is made up of one or more communicably coupled computers (e.g., see FIG. 4) that communicate across a network 130. In some implementations, the EDCS can wholly or partially be implemented to operate within or as a part of a cloud-computing-based environment. Although there is only one indicated instance of the network 130, one or more other illustrated connections between components of the EDCS 100 can also be considered part of the network 130. In some implementations, the illustrated EDCS 100 can be a client/server-type environment and include a client 102 (e.g., users operating a web browser/native application on a mobile computing device, etc.), a cloud backend 104, and an external optimization environment 140 communicating over the network 130. In some implementations, the cloud backend 104 can be a collection of backend servers, for example, an application server 106, DBMS server 120, an optimization server, and/or other servers for other purposes. Generally cloud-based backend servers are considered to be located at an operator's data center, but can be located in any location depending upon needs and desires of an operator (e.g., a leased data center(s), etc.).

In the example of FIG. 1, a backend server in the cloud backend 104 is illustrated as being either an application server 106 or a DBMS server 120 to assist with understanding. It is to be understood that the provided example is not mean to limit the disclosure to this illustrated implementation and that any other implementation consistent with this disclosure is considered to be within the scope of this disclosure. For example, a server can be considered to be a hardware or software (virtual) type server. In an instance where a server is a hardware instance, the illustrated DBMS can be considered to run across a one or more (e.g., 1 ... N) hardware servers. Each hardware can also execute one or more (e.g., 1 ... M) virtual servers. In some implementations, the DBMS server 120 can include a query processor 122, optimizer 124 (adhoc), a data storage 126, and a plan cache 128. In typical implementation, the functionality of the query processor 122, optimizer 124 (adhoc), data storage 126, and plan cache 128 is as described above or as commonly understood by one of ordinary skill in the art, apart from added functionality to permit integration of these or other components of the backend server 104 with the external optimization environment 140 and use of received optimized execution plans stored in the plan cache 128 (including in conjunction with adhoc optimization efforts).

"Integration" functionality may include the ability of the DBMS 120 (or other component of the backend server 104) to initiate query optimization of a query using the external optimization environment 140, request an optimized execution plan from the external optimization environment 140, receive and store data from the external optimization environment 140, and/other functionality associated with the external optimization environment 140 consistent with this disclosure as would be understood by one of ordinary skill in the art. In another implementation, an additional option would allow an administrator to use an API/command line interface to trigger an external optimization. For example, the administrator could either refer to statements in the plan cache (e.g., "optimize plan cache entry #N") or hand-off the SQL to an offline optimizer (e.g., "optimize this SQL <text>").

In some implementations, the external optimization environment 140 can include one or more optimizers 142 (offline) and, although not illustrated, other components necessary to the operation of an optimizer 142 (e.g., processor, memory, data storage (e.g., for execution plans, etc.), and the like). In some implementations, each optimizer 142 can communicate and work in conjunction with one or more other optimizers 142 to increase efficiency, speed, etc. of an offline optimization effort. For example, a group of optimizers 142 could act as a parallel-processing optimizer 142 to optimize one or more queries.

Figure 2:
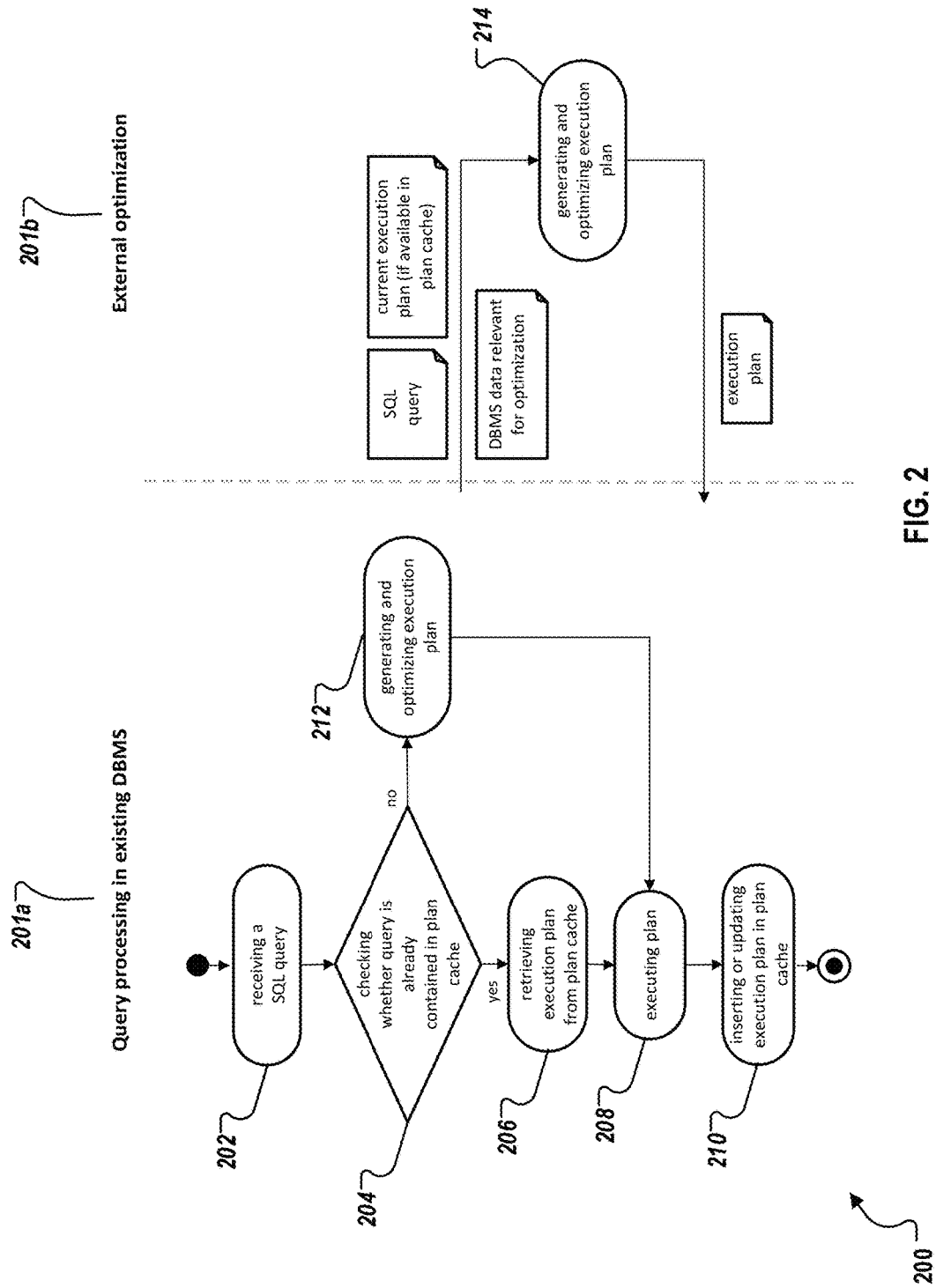
FIG. 2 is a flow chart of an example overall method for external offline query optimization, according to an implementation.

FIG. 2 is a flow chart of an overall example method 200 for external offline query optimization, according to an implementation. For clarity of presentation, the description that follows generally describes method 200 in the context of FIGS. 1 and 3-4. However, it will be understood that method 200 may be performed, for example, by any other suitable system, environment, software, and hardware, or a combination of systems, environments, software, and hardware as appropriate. In some implementations, various steps of method 200 can be run in parallel, in combination, in loops, and/or in any order.

The following processing takes place in an existing DBMS as indicated by 201a:

At 202, a query (e.g., a SQL query) is received by the DBMS. From 202, method 200 proceeds to 204.

At 204, the DBMS (e.g., the Query Processor 122, Optimizer 124, Plan Cache 128, and/or other component of the DBMS 120, application server 106, and/or backend server 104 (whether or not illustrated) determines whether an execution plan for the received query is already present in the plan cache 128.

If an execution plan for the received query is determined to be in the plan cache 128, method 204 proceeds to 206.

At 206, the execution plan is retrieved from the plan cache 128. From 206, method 200 proceeds to 208.

At 208, the execution plan is executed for the received query. From 208, method 200 proceeds to 210.

At 210, if necessary (if processing proceeded from 212 below to 208 and then to 210), a new or updated execution plan for the received query is inserted or updated, respectively, into the plan cache 128. Another reason for updating the plan cache (when not processing through 212), is the recording of actual execution parameters, such as actual time, number or result records and others. After 210, method 210 stops.

Returning to the determination of 204, if an execution plan for the received query is not in the plan cache 128, method 200 proceeds from 204 to 212.

At 212, an execution plan is generated and optimized for the received query. The question is whether an execution plan for the received query should be generated and optimized by an external offline optimization process. The adhoc optimizer is always involved and provides a default execution plan if no suitable execution plan is found in the plan cache (a standard system operates as if there was no external optimizer available). The difference is if an external optimizer is available in the system and triggered which can generated an externally optimized execution plan and replace an adhoc query plan with the externally optimized execution plan. In typical implementations, the external optimization works in parallel with the adhoc optimizer to save time generating an execution plan to be used instead of the adhoc execution plan.

For example, the query can be analyzed and an analysis performed to determine whether the received query meets particular thresholds or determined values to trigger an external optimization (e.g., complex, resource-intensive (expensive), repeatable, etc.) for part of or the whole received query. Expensive or often run SQLs can be collected for optimization using, for example, statement traces showing expensive query execution, plan cache analysis, etc.). In some implementations, a developer or database administrator can make a manual decision to trigger external optimization of the received query. In some implementations, all or a subset of received queries can be analyzed (e.g., a push or pull operation or triggered by some event) to determine whether to optimize the received query. For example, a DBMS can push analysis based on some event (e.g., such as a new query arrival) or the external optimizer (e.g., retrieving the most expensive queries from the plan cache). The described criteria but are not meant to be an exhaustive list of possible considered criteria and any other criteria consistent with this disclosure is considered to be within the scope of this disclosure.

If a determination is made to use external offline optimization, method 200 proceeds to 214 (executed as part of external optimization indicated by 201b).

At 214, the external optimization process takes, for example, the received query or a set of queries, current execution plans (if available in the plan cache 128), and/or DBMS data relevant for optimization and executes an external offline optimization process on the received query. Note that the external query optimization is independent from the determination at 204. If an execution plan is already contained in the plan cache, it can be used as a starting point to help speed up the external offline optimization process. From 214, method 200 proceeds to method 300 as described in FIG. 3.

Figure 3:
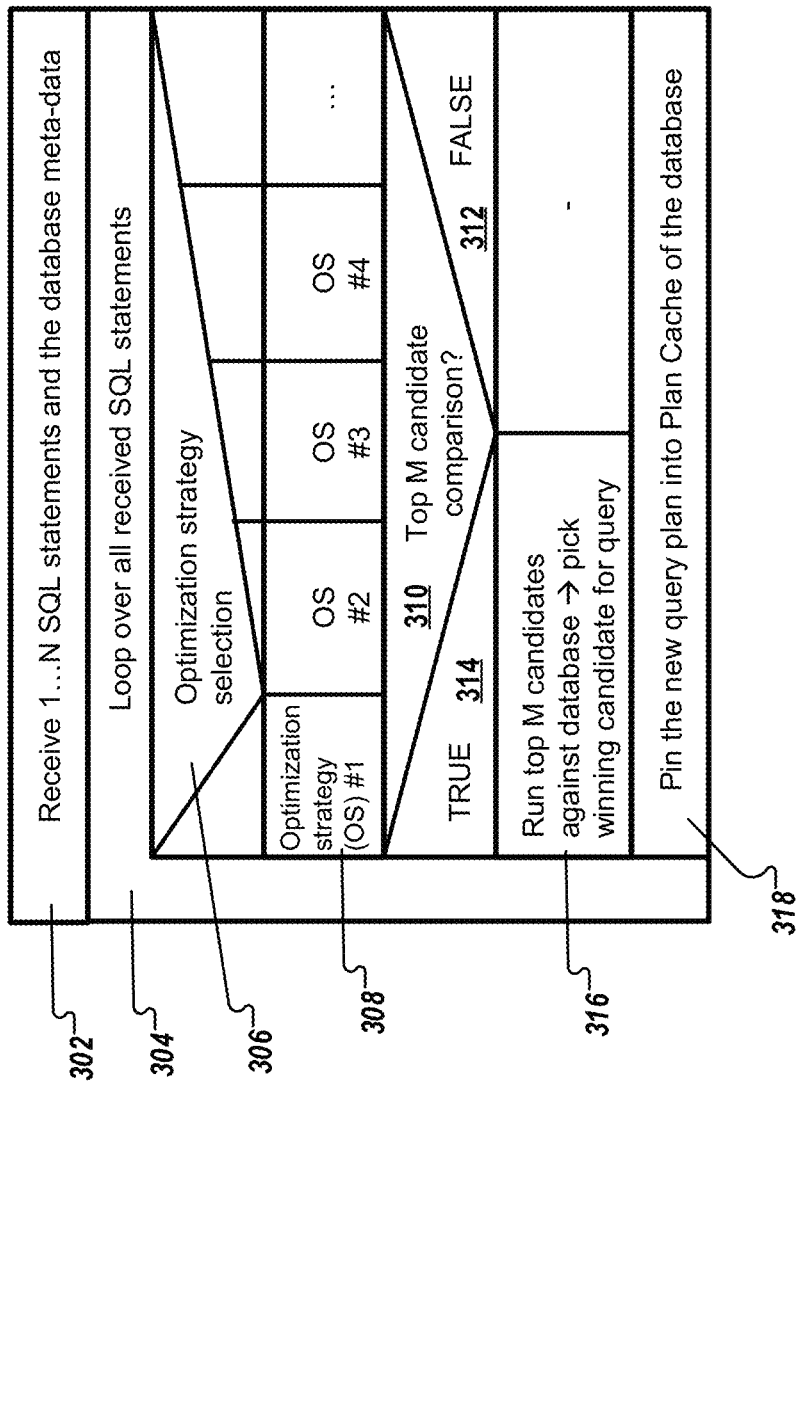
FIG. 3 is a flow chart of an example method of the external offline query optimization process, according to an implementation.

Turning to FIG. 3, FIG. 3 is a flow chart of an example method 300 of the external offline query optimization process, according to an implementation. For clarity of presentation, the description that follows generally describes method 300 in the context of FIGS. 1-2 and 4. However, it will be understood that method 300 may be performed, for example, by any other suitable system, environment, software, and hardware, or a combination of systems, environments, software, and hardware as appropriate. In some implementations, various steps of method 300 can be run in parallel, in combination, in loops, and/or in any order.

At 302, the external offline optimization process receives 1 . . . N SQL statements (e.g. as part of the received query) and DBMS metadata. DBMS metadata includes all data that describes the database content (e.g., table cardinality, table row size, selectivity of indices) and DBMS system parameters such as internal buffer size, available memory, available threads, and/or other data. In some implementations, the received SQL statements can, for example, come from a SQL monitoring view, be provided by a developer or database administrator, be part of development artifacts (e.g., a "bind" file), etc. The received DBMS metadata can, in some implementations, be from a database catalog (e.g., structure information for database table definition, etc.), histograms (e.g., data distribution within database tables), a currently used query plan plus execution times as a baseline, etc. An alternative would also be to extract SQL statements from an application during development and to then add externally optimized execution plans during deployment of the application. From 302, method 300 proceeds to 304.

At 304, all received SQL statements are looped over and analyzed. From 304, method 300 proceeds to 306.

At 306, either one optimization strategy is selected, or a set of several optimization strategies can be chosen. Possible optimization strategies include heuristics for applying transformation rules and rewriting an initial logical query plan (which is state of the art for current DBMSs). Other more resource consuming approaches like dynamic programming, branch-and-bound, branch-and-cut, Monte Carlo simulations, and/or brute force evaluation of (parts of) the plan space are also possible, because there are no critical time constraints in the external offline optimization. In addition, parametric query optimization (PQO) can also be applied. In this approach, the parameters of SQL queries (e.g. conditional clauses) and of the DBMS (e.g., table sizes, indices) are taken into account for optimization, because for one query and different regions of the parameter space, the optimal execution plans may differ. The optimization strategies selected at 306 can include methods for parametric query optimization. From 306, method 300 proceeds to 308.

At 308, the selected optimization strategy/strategies are executed. The execution(s) can be performed in parallel, concurrently, or sequentially, depending on the available system resources of the external optimization environment. In some implementations, if executed in sequence, optimization strategy(ies) can be executed on distributed computing environments such that one optimization strategy can be evaluated across multiple computing environments at the same time. The result of performing an optimization strategy is a (candidate) execution plan, together with its predicted execution time. If more than one candidate execution plan have been generated, at 310 a strategy for determining the final execution plan is applied. One possible strategy, at 312, performs no additional analysis and simply chooses the candidate plan with the lowest predicted execution time, and proceeds to 318.

Another possible strategy, at 314, selects the M best candidate plans (according to predicted execution time) generated at 308, and proceeds to 316.

At 316, the selected top M candidate plans are actually executed on the DBMS. The best performing plan determined by the lowest actual execution time is selected as the winning candidate optimization plan for the query. From 316, method proceeds to 318.

At 318, the new optimized execution plan is pinned into the plan cache of the DBMS (e.g., 210 of FIG. 2). In typical implementations, the plan cache only exists in the DBMS. Note that in some implementations, the execution plan can be pinned into the DBMS by the external offline optimizer at 318 (e.g., by a direct interface to the plan cache for inserting an externally generated execution plan), while in other implementations, the optimized query plan can be passed back to the DBMS to be pinned into the plan cache (e.g., by an indirect interface to insert an execution plan into the plan cache.

Returning to FIG. 2, from 214, method 200 proceeds back to 212 which proceeds to 208 where the execution plan is performed as described above. Also note that the returned optimized execution plan is then inserted or updated in the plan cache as described above in 210.

Figure 4:
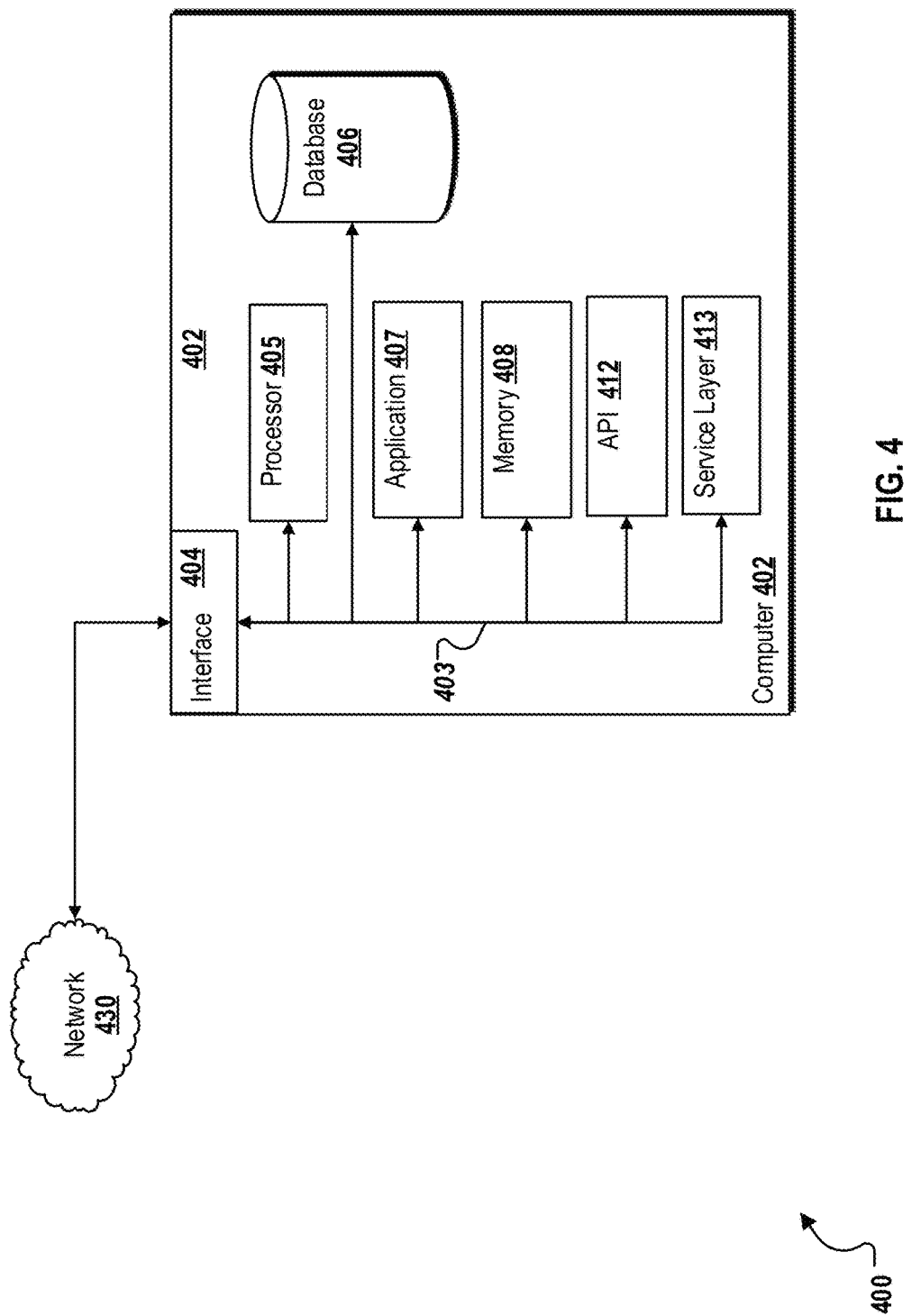
FIG. 4 is a block diagram of an exemplary computer used in the EDCS, according to an implementation.

FIG. 4 is a block diagram 400 of an exemplary computer 402 used in the EDCS 100, according to an implementation. The illustrated computer 402 is intended to encompass any computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. Additionally, the computer 402 may comprise a computer that includes an input device, such as a keypad, keyboard, touch screen, or other device that can accept user information, and an output device that conveys information associated with the operation of the computer 402, including digital data, visual and/or audio information, or a GUI.

The computer 402 can process for/serve as a client (e.g., client 102 or one or more subcomponents), a server (e.g., server 104 or one or more subcomponents), and/or any other component of the EDCS 100 (whether or not illustrated). The illustrated computer 402 is communicably coupled with a network 430 (e.g., network 140). In some implementations, one or more components of the computer 402 may be configured to operate within a cloud-computing-based environment.

At a high level, the computer 402 is an electronic computing device operable to receive, transmit, process, store, or manage data and information associated with the EDCS 100. According to some implementations, the computer 402 may also include or be communicably coupled with a cloud-computing server, application server, e-mail server, web server, caching server, streaming data server, business intelligence (BI) server, and/or other server.

The computer 402 can generate requests to transmit over network 430 (e.g., as a client 102) or receive requests over network 430 from a client application (e.g., a web browser or other application) and responding to the received requests by processing the said requests in an appropriate software application, hardware, etc. In addition, requests may also be sent to the computer 402 from internal users (e.g., from a command console or by other appropriate access method), external or third-parties, other automated applications, as well as any other appropriate entities, individuals, systems, or computers.

Each of the components of the computer 402 can communicate using a system bus 403. In some implementations, any and/or all the components of the computer 402, both hardware and/or software, may interface with each other and/or the interface 404 over the system bus 403 using an API 412 and/or a service layer 413. The API 412 may include specifications for routines, data structures, and object classes. The API 412 may be either computer-language independent or dependent and refer to a complete interface, a single function, or even a set of APIs. The service layer 413 provides software services to the computer 402 and/or the EDCS 100. The functionality of the computer 402 may be accessible for all service consumers using this service layer. Software services, such as those provided by the service layer 413, provide reusable, defined business functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 and/or the service layer 413 as stand-alone components in relation to other components of the computer 402 and/or EDCS 100. Moreover, any or all parts of the API 412 and/or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402 and/or EDCS 100. The interface 404 is used by the computer 402 for communicating with other systems in a distributed environment—including within the EDCS 100—connected to the network 430 (whether illustrated or not). Generally, the interface 404 comprises logic encoded in software and/or hardware in a suitable combination and operable to communicate with the network 430. More specifically, the interface 404 may comprise software supporting one or more communication protocols associated with communications such that the network 430 or interface's hardware is operable to communicate physical signals within and outside of the illustrated EDCS 100.

The computer 402 includes a processor 405. Although illustrated as a single processor 405 in FIG. 4, two or more processors may be used according to particular needs, desires, or particular implementations of the computer 402 and/or the EDCS 100. Generally, the processor 405 executes instructions and manipulates data to perform the operations of the computer 402. Specifically, the processor 405 executes the functionality required for external offline query optimization.

The computer 402 also includes a database 406 and memory 408 that hold data for the computer 402 and/or other components of the EDCS 100. Although illustrated as a single database 406 and memory 408 in FIG. 4, two or more databases 408 and memories 408 may be used according to particular needs, desires, or particular implementations of the computer 402 and/or the EDCS 100. While database 408 and memory 408 are illustrated as integral components of the computer 402, in alternative implementations, the database 406 and memory 408 can be external to the computer 402 and/or the EDCS 100. In some implementations, the database can be a conventional database or an in-memory database, or a mix of both. In some implementations, the database 406 and memory 408 can be combined into one component.

The application 407 is an algorithmic software engine providing functionality according to particular needs, desires, or particular implementations of the computer 402 and/or the EDCS 100, particularly with respect to functionalities required for external offline query optimization. For example, application 407 can serve as an engine in the optimizer 142, an application server, one or more components of the DBMS 120, and/or any other component of the EDCS 100 (whether or not illustrated). Further, although illustrated as a single application 407, the application 407 may be implemented as multiple applications 407 on the computer 402. In addition, although illustrated as integral to the computer 402, in alternative implementations, the application 407 can be external to the computer 402 and/or the EDCS 100.

There may be any number of computers 402 associated with, or external to, the EDCS 100 and communicating over network 430. Further, the term "client," "user," and other appropriate terminology may be used interchangeably as appropriate without departing from the scope of this disclosure. Moreover, this disclosure contemplates that many users may use one computer 402, or that one user may use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and/or parallel processing may be advantageous and performed as deemed appropriate.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
   determining that an execution plan for a received structure query language (SQL) database query to execute on a database is not present in a database plan cache;
   triggering an external offline optimization process not part of a query execution process to generate a plurality of externally optimized execution plans for the SQL database query using an external SQL database query optimizer in an external, $2^{nd}$-stage, offline optimization environment not constrained by computing resources consumed by an ad-hoc query optimizer, wherein the ad-hoc query optimizer generates a default execution plan for the received database query in parallel with the generation of the plurality of externally optimized execution plans using the external offline optimization process, and wherein the generation includes:

receiving all or part of the received SQL database query as SQL statements and metadata associated with the database;

looping over and analyzing all the received SQL statements;

selecting at least one optimization strategy for the SQL statements; and executing the selected at least one optimization strategy to generate the plurality of externally optimized execution plans;

executing the plurality of externally optimized execution plans on the database to determine a best performing execution plan based on the lowest actual execution time on the database; and pinning the best performing execution plan into the database plan cache using the external, $2^{nd}$-stage, offline optimization environment and a direct interface exposed by the database plan cache.

2. The method of claim 1, wherein the triggering is a result of meeting or exceeding a threshold value associated with the received database query.

3. The method of claim 1, comprising replacing the default execution plan with the externally optimized execution plan.

4. A non-transitory, computer-readable medium storing computer-readable instructions, the instructions executable by a computer and configured to:

determine that an execution plan for a received structure query language (SQL) database query to execute on a database is not present in a database plan cache;

trigger an external offline optimization process not part of a query execution process to generate a plurality of externally optimized execution plans for the SQL database query using an external SQL database query optimizer in an external, $2^{nd}$-stage, offline optimization environment not constrained by computing resources consumed by an ad-hoc query optimizer, wherein the ad-hoc query optimizer generates a default execution plan for the received database query in parallel with the generation of the plurality of externally optimized execution plans using the external offline optimization process, and wherein the generation includes instructions to:

receive all or part of the received SQL database query as SQL statements and metadata associated with the database;

loop over and analyzing all the received SQL statements;

select at least one optimization strategy for the SQL statements; and execute the selected at least one optimization strategy to generate the plurality of externally optimized execution plans;

execute the plurality of externally optimized execution plans on the database to determine a best performing execution plan based on the lowest actual execution time on the database; and pin the best performing execution plan into the database plan cache using the external optimization environment and a direct interface exposed by the database plan cache.

5. The non-transitory, computer-readable medium of claim 4, wherein the triggering is a result of meeting or exceeding a threshold value associated with the received database query.

6. The non-transitory, computer-readable medium of claim 4, comprising instructions to replace the default execution plan with the externally optimized execution plan.

7. A system, comprising:

a memory;

at least one hardware processor interoperably coupled with the memory and configured to:

determine that an execution plan for a received structure query language (SQL) database query to execute on a database is not present in a database plan cache;

trigger an external offline optimization process not part of a query execution process to generate a plurality of externally optimized execution plans for the SQL database query using an external SQL database query optimizer in an external, $2^{nd}$-stage, offline optimization environment not constrained by computing resources consumed by an ad-hoc query optimizer, wherein the ad-hoc query optimizer generates a default execution plan for the received database query in parallel with the generation of the plurality of externally optimized execution plans using the external offline optimization process, and wherein the generation is configured to:

receive all or part of the received SQL database query as SQL statements and metadata associated with the database;

loop over and analyzing all the received SQL statements;

select at least one optimization strategy for the SQL statements; and execute the selected at least one optimization strategy to generate the plurality of externally optimized execution plans;

execute the plurality of externally optimized execution plans on the database to determine a best performing execution plan based on the lowest actual execution time on the database; and pin the best performing execution plan into the database plan cache using the external optimization environment and a direct interface exposed by the database plan cache.

8. The system of claim 7, wherein the triggering is a result of meeting or exceeding a threshold value associated with the received database query.

9. The system of claim 7, further configured to replace the default execution plan with the externally optimized execution plan.

* * * * *